United States Patent
Rodriguez

(10) Patent No.: US 8,935,383 B2
(45) Date of Patent: Jan. 13, 2015

(54) SYSTEMS, APPARATUS, AND METHODS FOR NETWORK DATA ANALYSIS

(75) Inventor: John Rodriguez, Capitola, CA (US)

(73) Assignee: Verisign, Inc., Reston, VA (US)

( * ) Notice: Subject to any disclaimer, the term of this patent is extended or adjusted under 35 U.S.C. 154(b) by 340 days.

(21) Appl. No.: 13/077,550

(22) Filed: Mar. 31, 2011

(65) Prior Publication Data

US 2012/0173710 A1    Jul. 5, 2012

Related U.S. Application Data

(63) Continuation-in-part of application No. 12/983,179, filed on Dec. 31, 2010.

(51) Int. Cl.
    *G06F 15/173*    (2006.01)
    *H04L 29/06*    (2006.01)
    *H04L 12/26*    (2006.01)

(52) U.S. Cl.
    CPC .......... *H04L 63/1425* (2013.01); *H04L 43/026* (2013.01); *H04L 43/04* (2013.01); *H04L 63/1458* (2013.01); *H04L 2463/146* (2013.01)
    USPC .............................. 709/224; 709/223; 709/225

(58) Field of Classification Search
    CPC ........................ H04L 63/1425; H04L 63/1416
    USPC .................................................. 709/223–225
    See application file for complete search history.

(56) References Cited

U.S. PATENT DOCUMENTS

| | | | |
|---|---|---|---|
| 6,880,090 B1 | 4/2005 | Shawcross | |
| 6,930,978 B2 | 8/2005 | Sharp et al. | |
| 7,130,871 B2 | 10/2006 | Acree et al. | |
| 7,624,084 B2 * | 11/2009 | Chesla | 706/46 |
| 8,224,942 B1 * | 7/2012 | Presotto et al. | 709/223 |
| 2003/0065943 A1 * | 4/2003 | Geis et al. | 713/201 |
| 2003/0188189 A1 * | 10/2003 | Desai et al. | 713/201 |
| 2004/0054924 A1 | 3/2004 | Chuah et al. | |
| 2005/0096855 A1 * | 5/2005 | Teller | 702/55 |
| 2005/0249214 A1 | 11/2005 | Peng | |
| 2006/0095569 A1 * | 5/2006 | O'Sullivan | 709/224 |
| 2008/0120413 A1 | 5/2008 | Mody et al. | |
| 2008/0209033 A1 * | 8/2008 | Ginter et al. | 709/224 |

(Continued)

FOREIGN PATENT DOCUMENTS

WO    WO 2009/083022    7/2009

OTHER PUBLICATIONS

International Search Report and Written Opinion for Int'l. Appln. No. PCT/US2011/064329, mailed Apr. 25, 2012 (12 pages).

(Continued)

*Primary Examiner* — Rupal Dharia
*Assistant Examiner* — Joe Chacko
(74) *Attorney, Agent, or Firm* — MH2 Technology Law Group LLP

(57) ABSTRACT

Systems and methods are disclosed for analyzing network traffic data to detect anomalies in the data and determine their causes. In one implementation, a system includes a processor and a memory. The memory stores instructions that cause the processor to generate a time series of network traffic values. The processor calculates deviation scores for time entries within the time series and detects anomalies in the time series by comparing the deviation score to a predetermined range. If the processor detects an anomaly, it may determine a list of IP addresses of computers on the network that may have caused the anomaly.

19 Claims, 9 Drawing Sheets

(56) References Cited

U.S. PATENT DOCUMENTS

2010/0138919 A1    6/2010    Peng et al.
2010/0284283 A1    11/2010    Golic et al.
2011/0283360 A1    11/2011    Abadi et al.

OTHER PUBLICATIONS

International Search Report and Written Opinion for Int'l. Appln. No. PCT/US2011/064845, mailed Apr. 27, 2012 (12 pages).

Chen, Eric Y. and Yonezawa, Akinori, "Practical Techniques for Defending against DDoS Attacks", IEEE, 2005 (8 pages).

Sleurs, Kristof et al., "The Windowed Moments Change Test: A Novel Technique for Assessing Stationarity in Network Traffic", SPECTS, 2008, pp. 298-302 (5 pages).

Barford, Paul et al., "A Signal Analysis of Network Traffic Anomalies," *Proceedings of ACM Sigcomm Internet Measurement Workshop*, 2002, 12 pages, available at: http://pages.cs.wisc.edu/~pb/paper_imw_02.pdf.

\* cited by examiner

| Time | # of Requests |
|---|---|
| 00:00 | 1201 |
| 00:01 | 1177 |
| 00:02 | 1250 |
| 00:03 | 1300 |
| 00:04 | 1104 |
| 00:05 | 1205 |
| 00:06 | 1221 |
| 00:07 | 1284 |
| 00:08 | 1111 |
| 00:09 | 1402 |
| 00:10 | 1230 |
| 00:11 | 1233 |
| 00:12 | 1202 |
| 00:13 | 1201 |
| 00:14 | 1200 |

300

Large Time-Window 330

Small Time-Window 320

◀ Analyzed Time Entry 310

| Time | # of Requests | | |
|---|---|---|---|
| 00:00 | 1201 | | |
| 00:01 | 1177 | | |
| 00:02 | 1250 | | |
| 00:03 | 1300 | | |
| 00:04 | 1104 | | |
| 00:05 | 1205 | ← Analyzed Time Entry 410 | |
| 00:06 | 1221 | Small Time-Window 520 | Large Time-Window 530 |
| 00:07 | 1284 | | |
| 00:08 | 1111 | | |
| 00:09 | 1402 | | |
| 00:10 | 1230 | | |
| 00:11 | 1233 | | |
| 00:12 | 1202 | | |
| 00:13 | 1201 | | |
| 00:14 | 1200 | | |

FIG. 5

SYSTEMS, APPARATUS, AND METHODS FOR NETWORK DATA ANALYSIS

This application is a continuation-in-part of U.S. patent application Ser. No. 12/983,179, filed Dec. 31, 2010, the disclosure of which is expressly incorporated herein by reference in its entirety.

TECHNICAL FIELD

This disclosure is generally directed to systems and methods for analyzing network traffic data. More specifically, this disclosure is directed to systems and methods for detecting anomalies in the network traffic data and identifying potential causes of the anomalies.

BACKGROUND

Determining anomalies and the causes of anomalies in network traffic may enable networks to function more efficiently. For example, being able to detect sudden increases or decreases in network traffic and determining who or what is responsible for the sudden changes can help ensure that information is exchanged efficiently across networks.

Denial of Service (DoS) attacks may cause network anomalies. In a DoS attack, an attacker may overwhelm, and thus render inoperable, a server by sending the server thousands or millions of requests in rapid succession. Because the server must process each and every attack request, the server may be unable to process, or only very slowly process, requests from legitimate hosts.

Further, in a specific type of DoS attack called a Distributed Denial of Service (DDoS) attack, an attacker may control a large number of compromised computers to send requests to the targeted server simultaneously. For example, an attacker may obtain control over a large number of computers using a virus. The attacker may control the infected computers and instruct them to send requests over a network to a target computer system supporting computers operated by many clients. DDoS attacks may be more dangerous because of the increased number of requests. They also may be more difficult to detect because the requests originate from multiple IP addresses rather than a single source.

As one example, attackers may use DoS and DDoS attacks against Domain Name System (DNS) servers. DNS servers receive requests that include a domain name of a website (e.g., example.com). The DNS server responds to the client with the corresponding IP address (e.g. 1.1.1.1), so that the client may access the website. DNS servers may handle millions of requests every hour from many different clients. The large volume may make detecting a DoS or DDoS attack on a DNS server problematic, because it may be difficult to separate the malicious requests from the legitimate requests.

SUMMARY

Systems and methods consistent with disclosed embodiments analyze network traffic data to identify anomalies and determine the causes of the anomalies in the network traffic. Specifically, different embodiments analyze a time series of network traffic data to identify significant changes in the data over time, e.g., a change in the number of requests, a change in the number of bytes transferred, etc. If an anomaly is detected, systems and methods consistent with disclosed embodiments may determine which requesting computers may have been responsible for the anomaly for the purpose of reporting these computers to an administrator or taking other steps in response to the anomaly.

Systems and methods consistent with disclosed embodiments detect anomalies on a computer network. According to some embodiments, the systems and methods may generate a time series of network traffic values and calculate a deviation score for at least one analyzed time entry in the time series. The systems and methods may detect an anomaly at the analyzed time entry if the deviation score is outside a range. The systems and methods may also identify a group of IP addresses that may have been responsible for the anomaly by identifying a first group of IP addresses corresponding to a first time-window that corresponds to the analyzed time entry where the anomaly occurred, identifying a second group of IP addresses corresponding to a second time-window that corresponds to the analyzed time entry where the anomaly occurred, and comparing the first group of IP addresses to the second group of IP addresses.

In some embodiments, the systems and methods may generate a first variance by dividing a sum of the network traffic values of time entries corresponding to the first time-window by the network traffic value of the time series for the time entry, and may generate a second variance by dividing a sum of the network traffic values of time entries corresponding to the second time-window by the network traffic value of the time series for the time entry. The systems and methods may then calculate the deviation score by dividing the second variance by the first variance.

In certain embodiments, the systems and methods may determine that an anomaly has occurred if the deviation score is less than 0.5 or greater than 1.5. For example, in some embodiments, the systems and methods may identify, as the group of IP addresses that may have been responsible for the anomaly, the IP addresses that were included in the second group but were not included in a part of the first group corresponding to a part in the first time-window that does not overlap the second time-window, if the deviation score is greater than 1.5. Similarly, the systems and methods may identify, as the group of IP addresses that may have been responsible for the anomaly, the IP addresses that were included in the first group but not included in the second group, if the deviation score is less than 0.5.

In some embodiments, the time series may represent a number of DNS requests made to a DNS name server. In other embodiments, the time series may represent a number of IP requests measured by an analyzer at a router or a switch.

Consistent with other disclosed embodiments, computer-readable storage devices may store program instructions that are executable by one or more processors to implement any of the methods, disclosed herein.

Additional objects and advantages of disclosed embodiments will be set forth in part in the description which follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosed embodiments. In the drawings:

FIG. 3 is an exemplary time series, consistent with disclosed embodiments;

FIG. 5 is an exemplary time series, consistent with disclosed embodiments;

DESCRIPTION OF THE EMBODIMENTS

Disclosed embodiments provide systems and methods for detecting and mitigating network anomalies. Disclosed embodiments include methods and systems for collecting network traffic data, analyzing network traffic data, and determining information about the network anomaly, such as which client computers may be responsible for the network anomaly.

Reference will now be made in detail to the exemplary embodiments, examples of which are illustrated in the accompanying drawings. Wherever possible, the same reference numbers will be used throughout the drawings to refer to the same or like parts.

Figure 1:
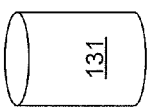
FIG. 1 is a diagram illustrating an exemplary network traffic anomaly detection system that may be used to implement disclosed embodiments.

FIG. 1 is a diagram illustrating an exemplary network traffic anomaly detection system 100 that may be used to implement disclosed embodiments, including exemplary system components. The components and arrangements, however, may be varied. A network data analysis server 120 may include a processor 122, a memory 123, input/output (I/O) devices (not shown), and storage 121. Network data analysis server 120 may be implemented in various ways. For example, network data analysis server 120 may be a general purpose computer, a server, a mainframe computer, or any combination of these components. Network data analysis server 120 may be standalone or it may be part of a subsystem, which may, in turn, be part of a larger system, such as a legacy name server system. In some embodiments, network data analysis server 120 may include a cluster of servers capable of performing distributed data analysis, e.g., using Google's MapReduce framework. Network data analysis server 120 may communicate over a link with network 115. For example, the link may be a direct communication link, a LAN, a WAN, or other suitable connection. Network 115 may include the Internet.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In some embodiments, memory 123 may include one or more network traffic collection programs or subprograms 124 loaded from storage 121 or elsewhere that, when executed by network data analysis server 120, perform various procedures, operations, or processes consistent with disclosed embodiments. In one embodiment, network traffic collection programs 124 may perform procedures, operations, or processes disclosed in U.S. patent application Ser. No. 13/077,344, directed to SYSTEMS AND METHODS FOR COLLECTING AND STORING NETWORK TRAFFIC DATA, filed Mar. 31, 2011, which is herein incorporated by reference. For example, memory 123 may include a network traffic collection program that goes to various edge sites and imports log files from each site; a network traffic processing program that reads the log files to extract data, formats the extracted data into header/digest pairs and stores the header/digest pairs in a database or other data repository; a reporting program that performs analysis on the stored data and processes queries for the stored data; and an integrated support program that links the other programs and allows them to use a common database, provides a common user interface, performs basic bookkeeping tasks, (such as deleting the network traffic files after the data has been extracted), and provides user guidance and help.

In some embodiments, memory 123 may also include one or more network data analysis programs or subprograms 125 loaded from storage 121 or elsewhere that, when executed by network data analysis server 120, perform various procedures, operations, or processes consistent with disclosed embodiments. For example, memory 123 may include a network data analysis program that generates a time series of network traffic values from stored network data; calculates a deviation score for time entries in the time series, the deviation score representing a degree of change in the time series; detects anomalies in the time series based on whether the deviation scores for various time entries are within a specific range; and, if it detects an anomaly, determines which client computers on the network may have caused the anomaly. Memory 123 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 123 may be configured with a network data analysis program 125 that performs several functions when executed by processor 122. For example, memory 123 may include a single program 125 that performs the functions of the network data analysis system, or program 125 could comprise multiple programs. Moreover, processor 122 may execute one or more programs located remotely from network data analysis server 120. For example, network data analysis server 120 may access one or more remote programs that, when executed, perform functions related to disclosed embodiments. Further, as discussed above, in some embodiments, network data analysis server 120 may include a cluster of servers capable of performing distributed data analysis. In these embodiments, network data analysis programs 125 may support distributed computing frameworks, e.g., Google's MapReduce framework, etc.

Memory 123 may be also be configured with an operating system (not shown) that performs several functions well known in the art when executed by network data analysis server 120. By way of example, the operating system may be Microsoft Windows™, Unix™, Linux™, Solaris™, or some other operating system. The choice of operating system, and even the use of an operating system, is not critical to any embodiment.

Network data analysis server 120 may include one or more I/O devices (not shown) that allow data to be received and/or transmitted by network data analysis server 120. I/O devices may also include one or more digital and/or analog communication input/output devices that allow network data analysis server 120 to communicate with other machines and devices, such as name server 140, network router 150, or client computers 160. Client computers 160 may provide requests from users representing queries of the data stored in storage 121 or data repository 130. Network data analysis server 120 may receive data from external machines and devices and output data to external machines and devices via I/O devices. The configuration and number of input and/or output devices incorporated in I/O devices may vary as appropriate for certain embodiments.

Network data analysis server 120 may also be communicatively connected to one or more data repositories 130, e.g., through network 115 or any other network. Data repository 130 may include one or more files or databases 131 that store information and are accessed and/or managed through network data analysis server 120. By way of example, the databases may be Oracle™ databases, Sybase™ databases or other relational databases, or non-relational databases, such as Hadoop sequence files, HBase or Cassandra. The databases or other files may include, for example, data and information related to the source and destination of a network request, the data contained in the request, etc. Systems and methods of disclosed embodiments, however, are not limited to separate databases.

FIG. 1 shows network data analysis server 120 including both network traffic collection programs 124 and network data analysis programs 125. However, in some embodiments, network data analysis server 120 may not include network traffic collection programs 124. For example, in some embodiments, another server may perform network data collection and formatting procedures consistent with the procedures performed by network traffic collection programs 124. In these embodiments, network data analysis server 120 may retrieve the formatted data from the other server or from a database, such as database 131, and perform the analysis on this data using network data analysis programs 125.

Network data analysis server 120 may be communicatively connected to one or more name servers 140 through network 115. In some embodiments, name server 140 may be owned or operated by a root name server operator. Name server 140 may process DNS packet requests, which may be sent by one or more client computers 160, and store information about the requests in a PCAP (packet capture) log file. Name server 140 may include a processor 142, a storage 141, and a memory 143. Storage 141 may be a volatile or non-volatile, magnetic, semiconductor, tape, optical, removable, nonremovable, or other type of storage device or computer-readable medium and may contain the PCAP log files. In some disclosed embodiments, memory 143 may include one or more collection programs or subprograms 144 loaded from storage 141 or elsewhere that, when executed by name server 140, read and extract data from the PCAP log files and send the extracted data to network data analysis server 120 or to another server that performs network data collection. Alternatively, programs 144 may include a program that allows network data analysis server 120 or another server to retrieve PCAP log files stored at name server 140. This network data may then be analyzed according to one or more of the methods and procedures discussed below.

Network data analysis server 120 may also be communicatively connected to one or more network routers 150 through network 115. Network router 150 may include a processor 152, a memory 153, and a storage 151. Network router 150 may also be communicatively connected to name server 140 and/or one or more or client computers 160 through network 115. Client computers may provide requests from users to network router 150, name server 140, or network data analysis server 120. Network router 150 may collect IP traffic information using a NetFlow™ protocol and create PCAP log files using this information. This network data may then be analyzed according to one or more of the methods and procedures discussed below. While a network router 150 is shown in FIG. 1, network data analysis server 120 may also collect network data from various switches on the network and/or from NetFlow™ analyzers that collect data related to routers, switches and/or servers connected to network 115.

One or more client computers 160 may be communicatively connected to name server 140 and network router 150 via network 115. Client computers 160 may make various requests to name server 140 and to other servers via network routers 150. For example, client computers 160 may make DNS requests to name server 140 in an effort to resolve IP addresses for domain names. Similarly, in some embodiments, network router 150 may be an edge router and may forward data packets related to requests for application or web servers. One or more of client computers 160 may also be responsible for network traffic data anomalies on network 115. For example, one or more of client computers 160 may launch a DoS or DDoS attack against name server 140, network router 150, or other components on network 115.

Figure 2:
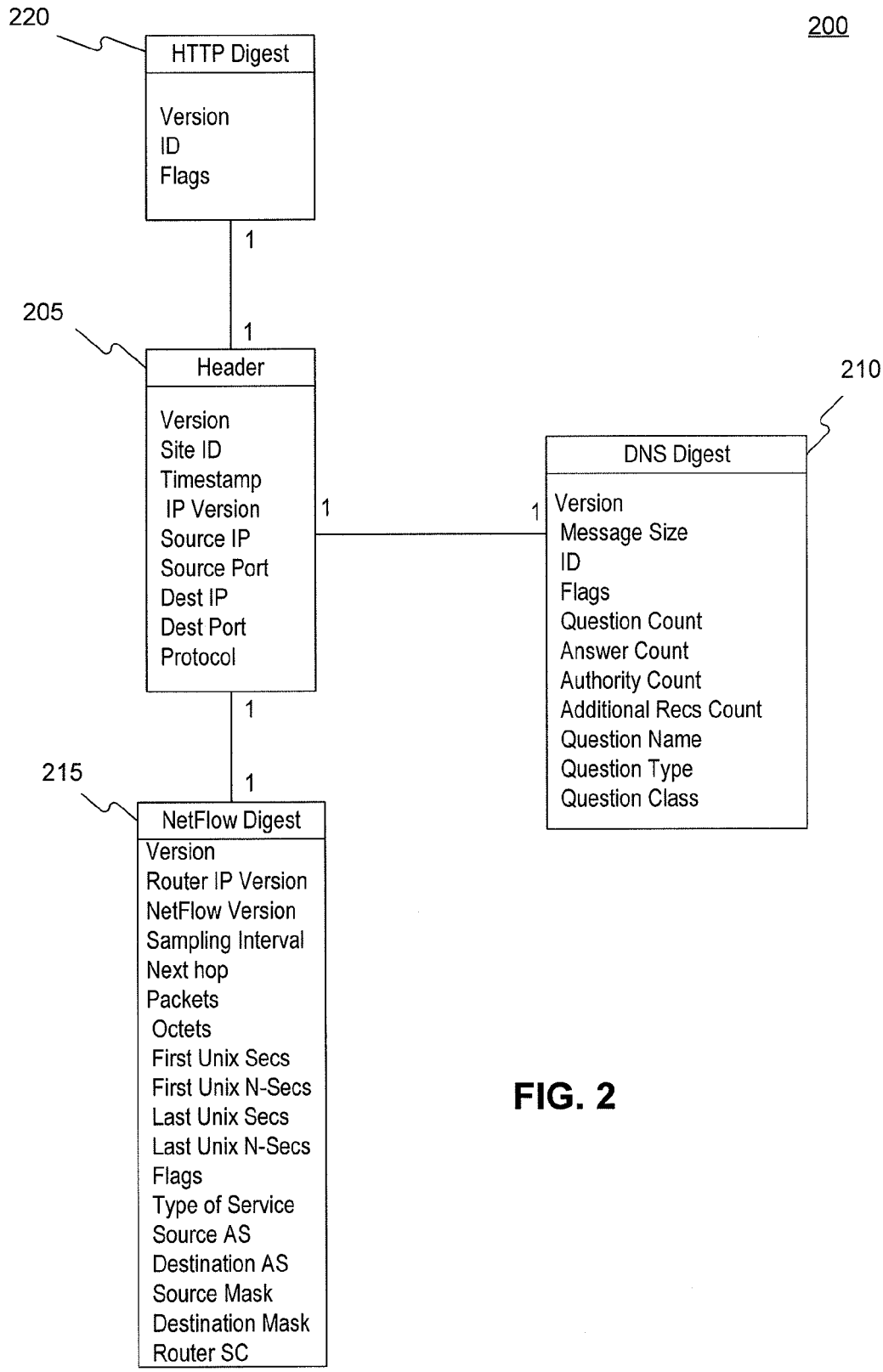
FIG. 2 is a diagram illustrating an exemplary data dictionary storing data extracted from network traffic log files, consistent with disclosed embodiments.

FIG. 2 is a diagram illustrating an exemplary data dictionary 200 storing data extracted from network traffic log files, consistent with disclosed embodiments. Network data analysis server 120 or another server that performs network data collection may create the records of data dictionary 200 after extracting data from network log files, such as PCAP files. Although the discussion below indicates that network data analysis server 120 creates the records of data dictionary 200, in alternative embodiments name server 140, network server 150, or another server that performs network data collection may create these records.

For each network request, e.g. a DNS request, network data analysis server 120 may create header record 205. Header record 205 may include a version number that represents an internal version number of the data dictionary. The version number may enable changes to be made to the layout of the records in data dictionary 200 while still maintaining backwards compatibility. Header record 205 may also include an identifier for the site at which the network request was recorded. The site ID may identify a particular name server 140 or network server 150. Header record 205 may also include a timestamp indicating the date and/or time when the network request was logged and the IP version (either "4" or "6") of the request. Header record 205 may also include the source IP address and port of the computer where the network request originated. Header record 205 may also include the destination IP address and port and the protocol number of the request. The protocol number may be a numeric representation of the IP protocol of the request (e.g. 6 for TCP and 17 for UDP). The information included in header record 205 may be common to all types of network traffic.

If the network traffic data that network data analysis server 120 extracts from one or more PCAP files is a DNS packet request sent, e.g., to name server 140, network data analysis server 120 may create DNS digest 210 in addition to header 205. DNS Digest may also include a version number that represents an internal version number of the data dictionary. DNS digest 210 may include data fields specific to a DNS request. For example, DNS digest 210 may include a message size that represents the size in bytes of the DNS portion of the message. DNS digest 210 may also include an ID populated from the DNS header and flag words from the DNS header. Data from the DNS header may also supply network data analysis server 120 with a question count, answer count, authority count, and additional records count, which network data analysis server 120 may store in DNS digest 210. DNS digest 210 may also include a question name, which represents the question asked by the packet, including, e.g., the domain name that was requested to be resolved, the types of DNS records that were requested (e.g., NS, A, MX), the top level domain (e.g., .com, .net, .us) of the domain requested to be resolved, etc.; a question type; and a question class. Network data analysis server 120 may extract these data fields from the DNS packet request.

If the network traffic data that network data analysis server 120 extracts from one or more PCAP files is a NetFlow™ request, network data analysis server 120 may create NetFlow digest 215 in addition to header 205. Like header 205 and DNS digest 210, NetFlow digest 215 may include a data dictionary version number. In addition, NetFlow digest 215 may include the IP version of the router IP address, the NetFlow export format version, the sampling interval field from the NetFlow header, the IP address of the next hop of flow, the number of packets in the flow, and the total count of layer 3 octets in the flow. NetFlow digest 215 may also include Unix seconds of the first packet in the flow, the residual nanoseconds of the first packet time, Unix seconds of the last packet in the flow, and the residual nanoseconds of the last packet time. NetFlow digest 215 may also include the cumulative OR of TCP flags, the IP type-of-service flow, the AS number of the source, the AS number of the destination, the source address prefix mask bits, and the Net Flow version 7 IP of the router bypassed by Catalyst 5000.

In some embodiments, network data analysis server 120 may process HTTP request log records, creating HTTP digest 220. HTTP digest 220 may include a data dictionary version number and other fields captured from the HTTP log record. Network data analysis server 120 may also create other types of digests for other network traffic log files.

The records stored in data dictionary 200 may be used by programs or queries for data mining and to identify important trends in the network traffic data. Of course, the format of data dictionary 200 is exemplary only, and any format may be used. In some embodiments, network data analysis server 120 may use records stored in data dictionary 200 to generate time series of network data, detect anomalies in the network data, and determine which client computers may have caused the anomalies.

When detecting whether an anomaly has occurred in the network data, network data analysis server 120 may generate a time series from the records stored in data dictionary 200. The time series may contain information divided by a particular time interval. For example, the time series may be divided into one-second intervals. The time series may contain information about network traffic relevant to each interval, e.g. number of requests made to a particular server or group of servers, number of requests made by a particular IP address or group of IP addresses, total size of all requests made to a particular server or group of servers, total size of all requests made by a particular IP address or group of IP addresses, etc.

In an embodiment where network data analysis server 120 generates the time series of all DNS requests made to a particular DNS name server, such as name server 140, network data analysis server 120 may generate the time series based on the timestamps in header 205 for the requests made to the particular DNS name server. Network data analysis server 120 may generate the time series by dividing the requests into groups corresponding to the time on their timestamp, and adding up the number of requests made during certain time entries within the time series.

For example, the time series may contain information about network traffic from 19:00:00 to 20:00:00. The first interval may contain information relating to traffic between 19:00:00 and 19:00:01, the second interval may contain information relating to traffic between 19:00:01 and 19:00:02, and so on. In one embodiment, the time series may contain information about the total number of requests received by a server, such as the total number of DNS requests received by name server 140:

| Interval | Total Requests |
|---|---|
| 19:00:00-19:00:01 | 150 |
| 19:00:01-19:00:02 | 1800 |
| 19:00:02-19:00:03 | 180 |
| . | . |
| . | . |
| . | . |
| 19:59:59-20:00:00 | 1800 |

The time series may, as shown in the table above, include an indication of the interval to which each piece of network traffic information relates. This indication may be a range as shown above; or a start time, where the interval is deemed to be the interval between the start times of consecutive entries. The time series may also be compiled without such an indication where each piece of network traffic information is deemed to relate to a period of predetermined length. For example, if a time series starts at 19:00:00, the $100^{th}$ entry may be deemed to start at 19:01:39 and end at 19:00:40.

In some embodiments, a time series may contain network traffic information relating to a number of parameters. For example, for each interval, the time series may contain a number indicating the total number of requests received at a server from each source IP address or from groups of IP addresses. Network data analysis server 120 may generate these time series by sorting the requests based on the Source IP field in header 205, for example. The table below illustrates an exemplary time series that may indicate the number of requests received from each source IP address:

| Interval | 1.1.1.2 | 1.1.1.3 | 1.1.1.4 |
|---|---|---|---|
| 19:00:00-19:00:01 | 150 | 3 | 100,000 |
| 19:00:01-19:00:02 | 1,800 | 2 | 1,000 |
| 19:00:02-19:00:03 | 180 | 0 | 15,000 |
| . | . | . | . |
| . | . | . | . |
| . | . | . | . |
| 19:59:59-20:00:00 | 180 | 5 | 12,000 |

The network traffic information in the time series may include and be sorted by any piece of information in the records stored in data dictionary 200. For example, the data in the time series may include the number of packets that conform to a particular class (e.g., a particular source IP address), that have a data dictionary value within a certain range, or may be devised otherwise. For example, the time series may show the total number of different IP addresses that made IP requests or the number of different domain names that were requested to be resolved.

The time series may be generated in a number of different ways. For example, in some embodiments, the time series may be generated from the records in data dictionary 200 using a distributed computing framework, such as the MapReduce framework made available by Google. A person skilled in the art will appreciate the variety of other methods that may be used to compile a time series based on such data.

FIGS. 3 through 6 show exemplary time series and illustrate how time entries within the time series may be analyzed, consistent with disclosed embodiments. When the entry being analyzed is changed, the time-windows may move along with the entry being analyzed. For example, if the entry being analyzed changes by one second, the start and end of each time-window may move by the same amount.

Figure 4:
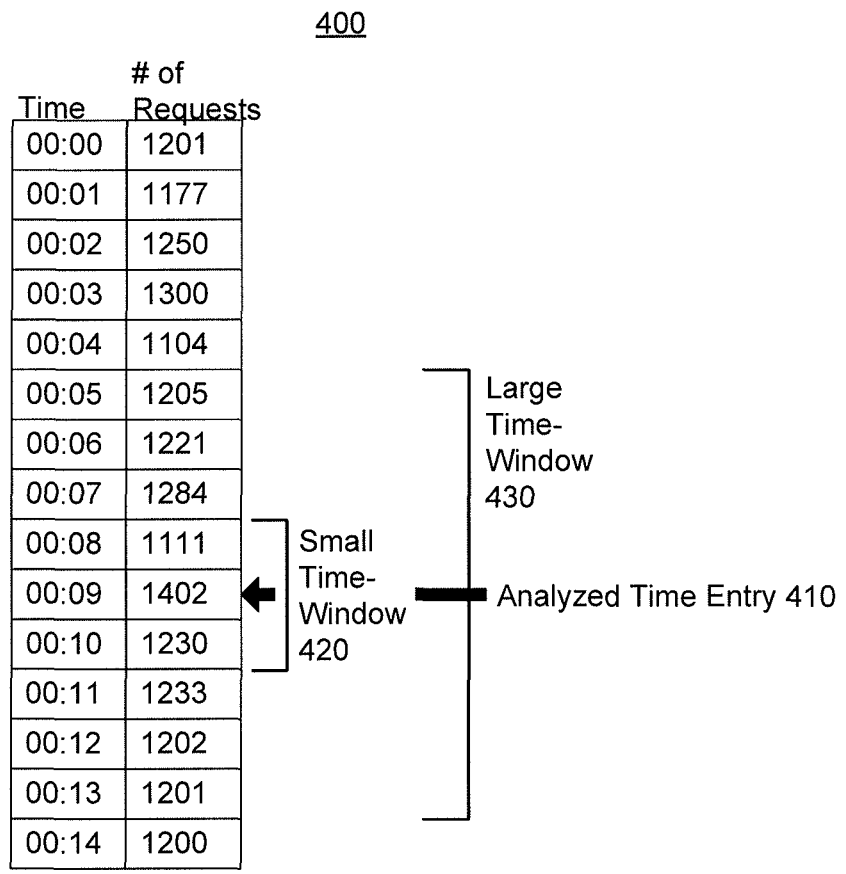
FIG. 4 is an exemplary time series, consistent with disclosed embodiments.
Figure 6:
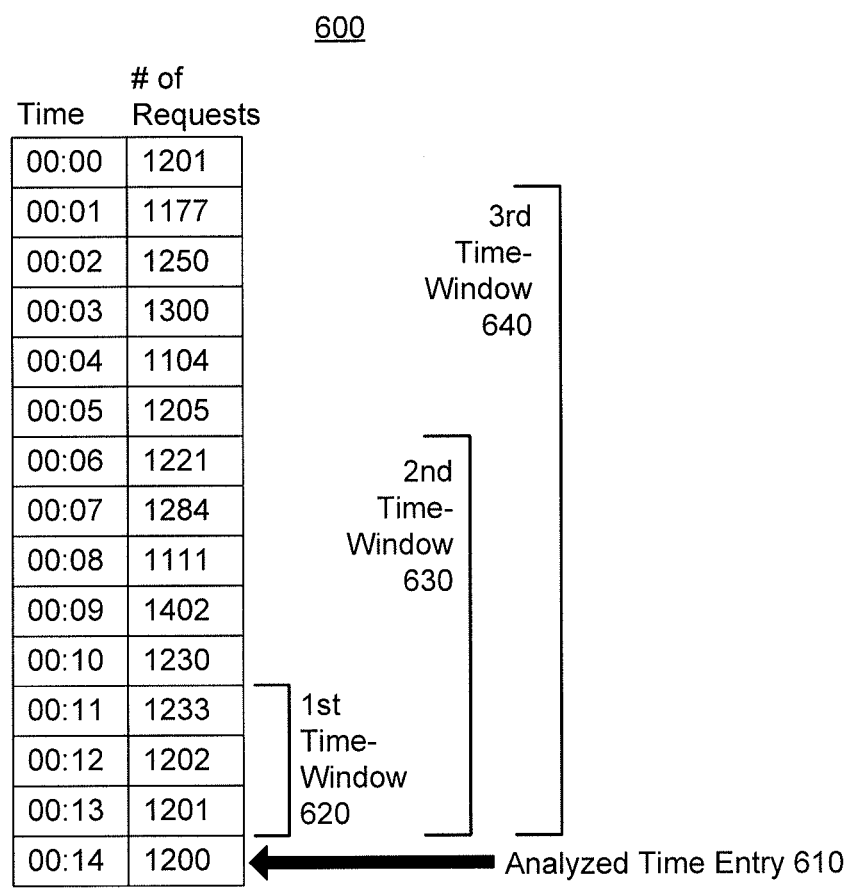
FIG. 6 is an exemplary time series, consistent with disclosed embodiments.

As illustrated by FIGS. 3 through 6 the size and number of the time-windows, as well as their position relative to each other and the time entry being analyzed by vary. For example, FIG. 3 shows an exemplary time series 300 with an analyzed time entry 310, and a first small time-window 320 and a second large time-window window 330 ending at the same point. FIG. 4 shows an exemplary time series 400 with an analyzed time entry 410, and a first small time-window 420 positioned in the middle of a second large time-window 430. FIG. 5 shows an exemplary time series 500 with an analyzed time entry 510, and a first small time-window 420 and a second large time-window 430 starting at the same point. FIG. 6 shows an exemplary time series 600 with an analyzed time entry 610 and three time-windows 620, 630, and 640 of different sizes, each ending at the same point.

Further, while FIGS. 3 through 6 show time series with one-second time entries, any time interval may be used. For example, in one embodiment, the time entry may be two seconds, the first time-window 320 may be twenty seconds, and the second time-window 330 may be two minutes. In another embodiment, the time entry may be one second, the first window may be one minute, and the second window may be ten minutes.

The four time series shown in FIGS. 3 through 6 are illustrative only. Any number of time-windows of any size may be used with any positioning relative to each other and the time entry being analyzed. For example, in some embodiments the time entry being analyzed may be included in one or more of the time-windows. The discussion below will refer to FIG. 3, but one of ordinary skill will appreciate that the methods discussed below can be applied to any configuration of time entries and time-windows.

After network data analysis server 120 generates the time series, network data analysis server 120 may calculate a variance value for each analyzed time entry 310 in the time series with respect to each of the time-windows 320 and 330. In some embodiments, network data analysis server 120 calculates the variance value by dividing the total value of all time entries in the selected time-window by the total value of the selected time entry. For example, the variance value for analyzed time entry 310 with respect to small time-window 320 would be calculated by dividing the sum of the values of all time entries in small time-window 320 (1233+1202+1201=3636) by the value of analyzed time entry 310 (1200). Therefore the variance of analyzed time entry 310 with respect to small time-window 320 would be 3636/1200 or 3.03. The variance of analyzed time entry 310 with respect to large time-window 330 may be calculated in a similar way using the sum of all time entries in large time-window 330.

In one embodiment, variance values may be calculated for each time entry in the time series. In other embodiments, variance values may be calculated for selected time entries only. For example, variance values may only be calculated for every other time entry, every third time entry, etc.

After network data analysis server 120 has calculated a variance value for the analyzed time entries in the time series with respect to each time-window, network data analysis server 120 may calculate a deviation score for each of the analyzed time entries. When there are two time-windows, this may be done by dividing the variance value for the small time-window 320 by the variance value for the large time-window 330. In some embodiments, a number of other metrics may be used as the deviation score, e.g., the inverse ratio, the variance value for the small time-window divided by the square of the variance value for the large time-window, the difference between the two variance values, the difference between the two variance values divided by one of the two variance values, etc. A person skilled in the art will appreciate the vast number of useful ways these two numbers may be combined to form a deviation score. When more than two time-windows are used, the same type of analysis may be used, and the analysis may be used in relation to two time-windows at a time.

Network data analysis server 120 may detect an anomaly in the network traffic data by determining if the deviation score is outside a particular range. In one embodiment, this range is about 0.5 to 1.5. In another embodiment, this range is about 0.4 to 1.6. In yet another embodiment, an anomaly may be detected by observing that the deviation score is within a particular range. The range used may vary based on the data being observed and how the deviation score is calculated. For example, one range may be used for analyzing traffic data relating to all requests received, whereas another range may be used when analyzing data relating to a particular range of source IP addresses.

If network data analysis server 120 detects an anomaly, network data analysis server 120 may perform additional analysis to determine potential client computers 160 that may have caused the anomaly. In one embodiment, network data analysis server 120 may identify a first group of IP addresses that correspond to large time-window 330. For example, the IP addresses in the first group may include the IP addresses of all of the client computers that made requests during large time-window 330. Similarly, network data analysis server 120 may identify a second group of IP addresses that correspond to small time-window 320. For example, the IP addresses in the second group may include the IP addresses of all of the client computers that made requests during small time-window 320.

Network data analysis server 120 may then compare the first group and the second group, based on the deviation score, to identify a set of IP addresses that may have caused the anomaly. In one embodiment, a deviation score less than 0.5 may indicate that there has been a sudden decrease in the amount of network traffic. Such a decrease may be caused by a group of client computers that are improperly being denied access to the server, router, or switch being analyzed. In this embodiment, network data analysis server 120 may identify a third group of IP addresses that were included in the first group corresponding to large time-window 330 but not in the second group corresponding to small time-window 320. Network data analysis server 120 may then determine that one or more client computers corresponding to the IP addresses in the third group contributed to the network anomaly.

On the other hand, a deviation score greater than 1.5 may indicate that there has been a sudden increase in the amount of network traffic. Such an increase may be caused by a DoS or DDoS attack, for example. In this embodiment, network data analysis server 120 may identify a third group of IP addresses that were included in the second group corresponding to the small window 320, but were not included in a part of the first group corresponding to a part of the large window 330 that does not overlap the small window. In another embodiment, network data analysis server 120 may identify the second group of IP addresses corresponding to small time-window 320 as the third group. Network data analysis server 120 may then determine that one or more client computers corresponding to the IP addresses in the third group is contributing to the network anomaly.

In one embodiment, the time series of the network traffic data may be divided into different categories and the data relating to each category may be treated as a separate time series and analyzed accordingly. For example, analysis may be performed on network traffic data for packets with a source IP address in the range of 0.0.0.0-25.153.153.153; a sample time series for such data may resemble the following:

| Interval | Requests from 0.0.0.0-25.153.153.153 |
|---|---|
| 19:00:00-19:00:01 | 1,871 |
| 19:00:01-19:00:02 | 13,567 |
| 19:00:02-19:00:03 | 27,876 |

Analysis may then be performed on the other categories for which data was compiled. If an anomaly is detected, the relevant data may be further studied. For example, if an anomaly is discovered when analyzing packets with a source address between 25.153.153.153 and 51.51.51.51, this network data may then be divided into further categories that are in turn analyzed individually again. In one embodiment, the current category may be divided further, such that the range of 25.153.153.153-51.51.51.51 is further divided into 10 ranges. In another embodiment of the invention, the traffic may be analyzed with respect to a new set of categories chosen from fields in data dictionary 200, for example, the source-port of the packet, a requested IP address, etc.

In some embodiments, network traffic may be analyzed in real-time, and network traffic data may be collected and analyzed as packets are received. In other embodiments, network traffic may not be processed in real time. When using non-real-time processing, network traffic may be processed in batches of varying sizes. The batches of traffic may be processed in parallel by different threads on a single computer, by different computers, using a parallel computing cluster or by other means. In one embodiment, the Hadoop framework may used to facilitate the batch-processing of data in conjunction with the Google MapReduce framework.

Figure 7:
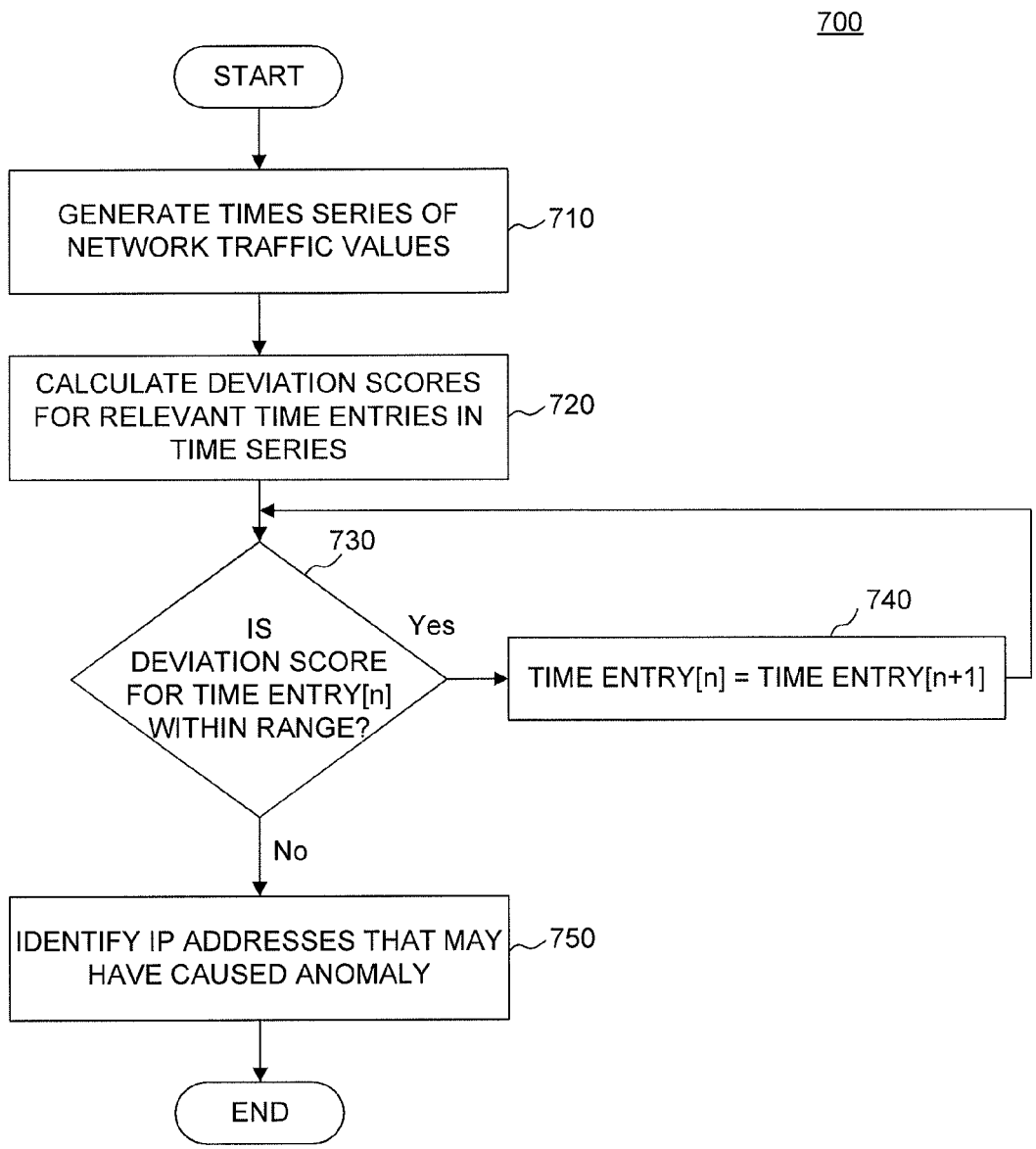
FIG. 7 is a flow diagram of a network traffic data anomaly detection process, consistent with disclosed embodiments.

FIG. 7 is a flow diagram of a network traffic data anomaly detection process 700, consistent with disclosed embodiments. Network data analysis server 120 may perform process 700, for example. In certain embodiments, process 700 may be implemented according to network data analysis programs 125. In some embodiments, process 700 may be performed by one or more servers using a distributed computing framework such as the MapReduce framework.

At step 710 network data analysis server 120 may generate a time series of network traffic values. As discussed above, the network traffic values may include any values from the records stored in data dictionary 200, e.g. number of requests made, total size of requests made, number of requests made from a certain IP address or group of IP addresses, etc.

At step 720, network data analysis server 120 may calculate deviation scores for relevant time entries in the generated time series. As discussed above, in some embodiments network data analysis server 120 may calculate deviation scores for each of the time entries in the time series. In other embodiments, network data analysis server 120 may calculate deviation scores for fewer than all of the time entries in the time series, e.g., every other time entry, every third time entry, etc. An exemplary deviation score calculation process is discussed in greater detail below with respect to FIG. 8.

At step 730, network data analysis server 120 may determine whether a deviation score for a particular time entry is within a predetermined range. For example, in certain embodiments, the range may be 0.5 to 1.5. If the deviation score for that particular time entry is in the predetermined range, network data analysis server 120 may determine that no anomaly exists for that particular time entry. Then, at step 740, network data analysis server 120 may proceed to the next time entry for which a deviation score was calculated. Network data analysis server 120 may then return to step 730 and determine if the deviation score for the next time entry is within the predetermined range.

If, at step 730, network data analysis server 120 determines that the deviation score for a particular time entry is outside of the predetermined range, it may determine that an anomaly exists for that particular time entry. Then, at step 750, network data analysis server 120 may identify IP addresses that may have caused the anomaly. These IP addresses may be output, for example, to an administrator for the server, router, or switch being analyzed, in order to perform additional analysis and/or take action to mitigate the anomaly. An exemplary anomaly source determination process is discussed in greater detail below with respect to FIG. 9.

Figure 8:
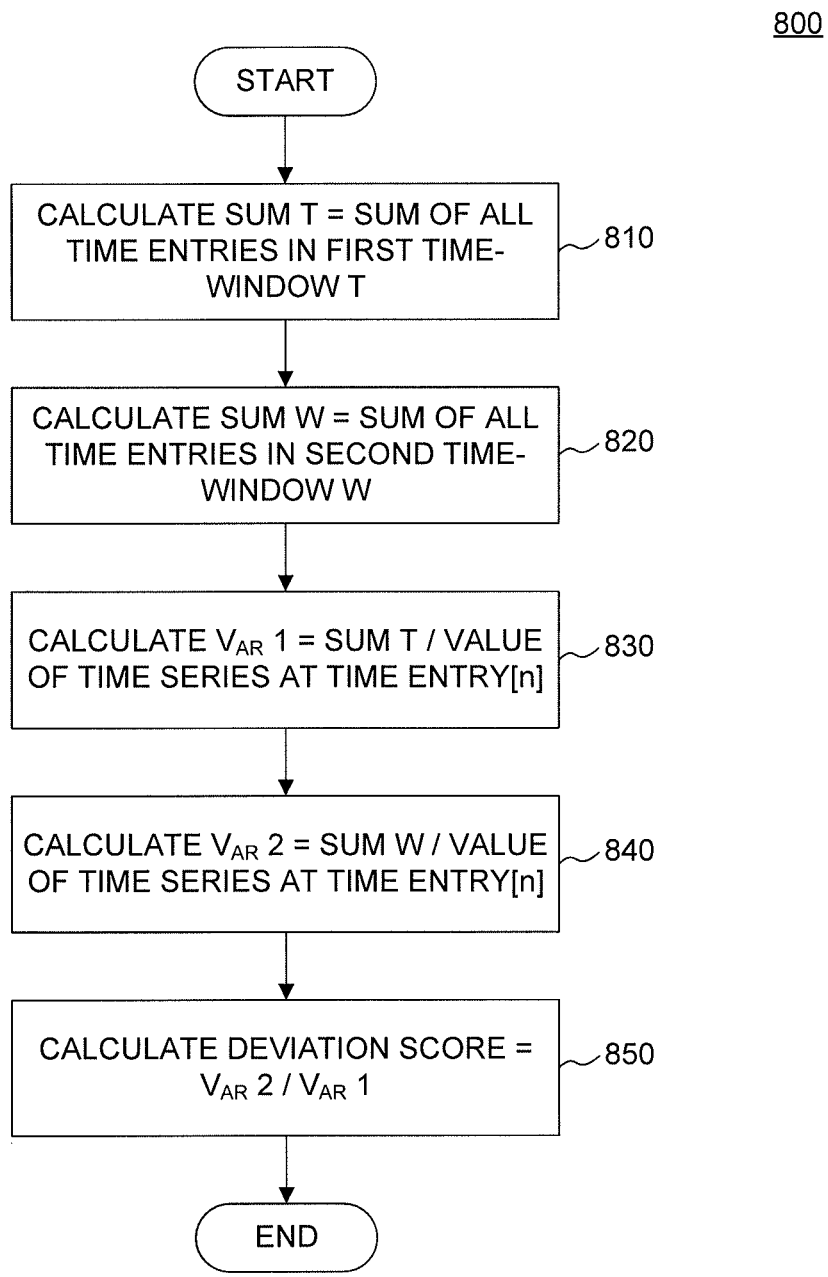
FIG. 8 is a flow diagram of a deviation score calculation process, consistent with disclosed embodiments.

FIG. 8 is a flow diagram of an exemplary deviation score calculation process 800, consistent with disclosed embodiments. Network data analysis server 120 may perform process 800 as part of step 720 in FIG. 7, for example. Network data analysis server 120 may perform the steps in process 800 for each time entry being analyzed.

At step 810, network data analyzer 120 calculates a sum of all time entries in a first time-window T (Sum T). At step 820, network data analyzer 120 calculates a sum of all time entries in a second time-window W (Sum W). In some embodiments, the first time-window T may be larger than the second time-window W. However, as discussed above, the relative size and positions of the window may vary consistent with different embodiments.

At step 830, network data analyzer 120 calculates the variance of the selected time entry with respect to the first time-window T (Var 1). For example network data analyzer 120 may calculate Var 1 as Sum T divided by the value of the time series at the selected time entry.

At step 840, network data analyzer 120 calculates the variance of the selected time entry with respect to the second time-window W (Var 2). For example network data analyzer 120 may calculate Var 2 as Sum W divided by the value of the time series at the selected time entry.

At step 850, network data analyzer 120 calculates the deviation score for the selected time entry. For example, network data analyzer 120 may calculate the deviation score as Var 2 divided by Var 1. However, as discussed above, the deviation score may be calculated in a variety of different ways consistent with disclosed embodiments.

Network data analyzer 120 may perform the steps in process 800 for each of the selected time entries to be analyzed. In some embodiments, network data analyzer 120 may perform the same step of process 800 for all of the selected time entries before moving on to a subsequent step. In other embodiments, network data analyzer 120 may perform all steps of process 800 for one selected time entry and then perform the steps for the next selected time entry.

Figure 9:
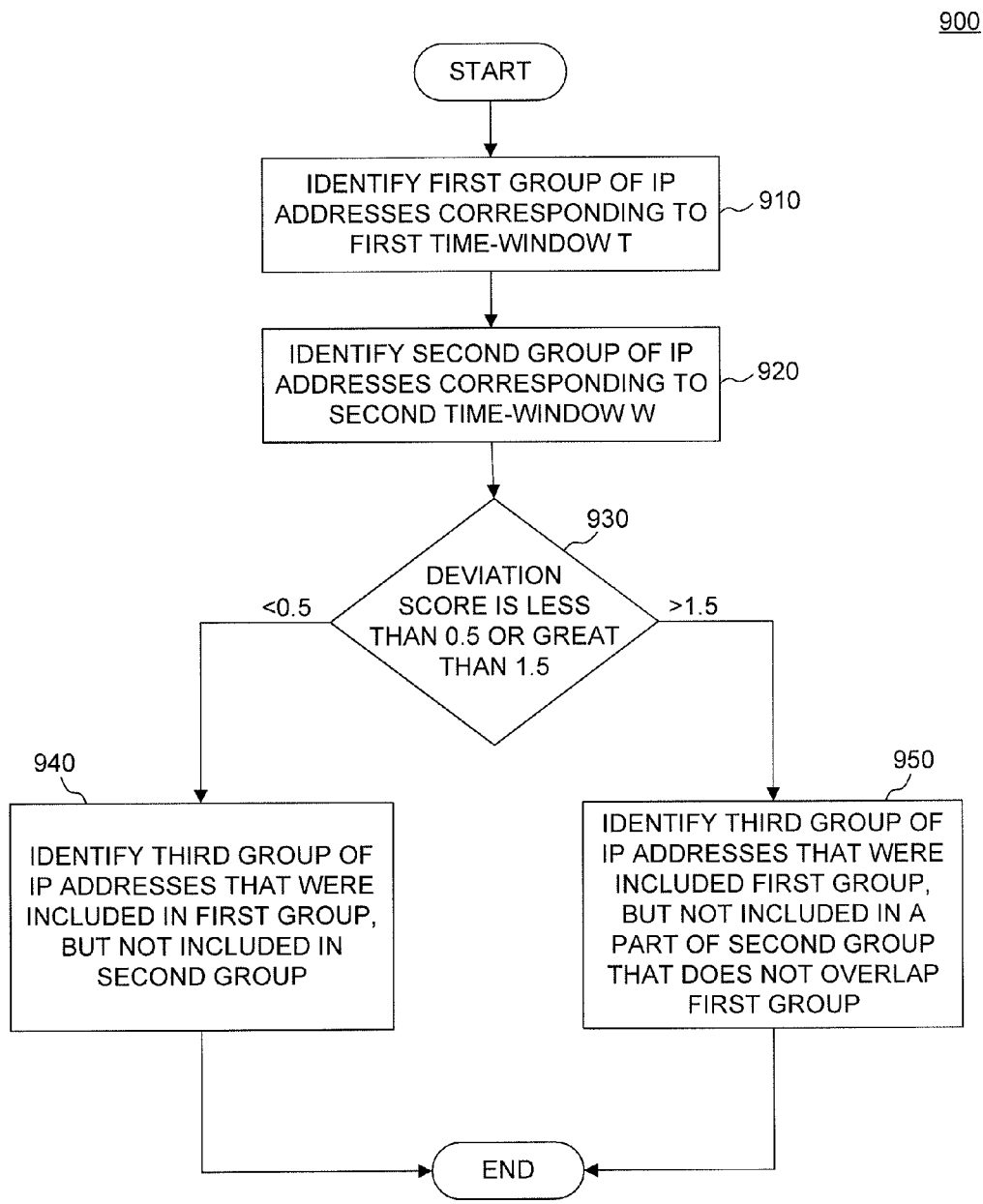
FIG. 9 is an anomaly source determination process, consistent with disclosed embodiments.

FIG. 9 is a flow diagram of an exemplary anomaly source determination process 900, consistent with disclosed embodiments. Network data analysis server 120 may perform process 900 as part of step 750 in FIG. 7, for example.

At step 910, network data analyzer 120 may identify a first group of IP addresses corresponding to the first time-window T. For example, the first group of IP addresses may include the IP addresses of all client computers 160 that made requests to the server, router, or switch being analyzed within the first time-window T. At step 920, network data analyzer 120 may identify a second group of IP addresses corresponding to the second time-window W. For example, the second group of IP addresses may include the IP addresses of all client computers 160 that made requests to the server, router, or switch being analyzers within the second time-window W.

At step 930, network data analyzer 120 may determine whether the deviation score calculated in step 720 is less than 0.5 or greater than 1.5. As discussed above, method 900 may be performed as part of step 750. Thus, at this point, network data analyzer 120 has already detected an anomaly for the analyzed time entry. Also, as discussed above, 0.5 and 1.5 are exemplary ranges for the deviation value and may be adjusted in accordance with disclosed embodiments.

If, at step 930, network data analyzer 120 determines that the deviation score is less than 0.5, then network data analyzer 120 may proceed to step 940. At step 940, network data analyzer 120 may identify a third group of IP addresses that were included in the first group corresponding to the first time-window T but not in the second group corresponding to the second time-window W. Network data analysis server 120 may then determine that one or more client computers corresponding to the IP addresses in the third group contributed to the network anomaly.

If, at step 930, network data analyzer 120 determines that the deviation score is greater than 1.5, then network data analyzer 120 may proceed to step 950. At step 950, network data analyzer 120 may identify a third group of IP addresses that were included in the second group corresponding to the second time-window W, but were not included in a part of the first group corresponding to a part of the first time-window T that does not overlap the second time-window W. In another embodiment, network data analysis server 120 may identify the second group of IP addresses in the second time-window W as the third group. Network data analysis server 120 may then determine that one or more client computers corresponding to the IP addresses in the third group contributed to the network anomaly.

In some embodiments, network data analyzer 120 may automatically take steps to mitigate the anomaly. For example, if network data analyzer 120 determines that a group of IP addresses have caused an increase in network traffic, network data analyzer 120 may send instructions to a server, router, and/or switch to stop processing requests from these IP addresses or to only process a subset of their requests.

In other embodiments, network data analyzer 120 may output the group of IP addresses that may be contributing to the anomaly to administrators and/or analysts. The administrators and/or analysts may further analyze the group of IP addresses to determine the cause and source of the anomaly.

For example, the IP addresses identified by network data analyzer 120 may contain false positives, e.g., IP addresses that did not actually cause the anomaly, depending on the predetermined range set for the deviation score. In certain network applications, it may be undesirable to automatically deny service to all IP addresses identified by network data analyzer 120, because denying requests to the false positives may upset legitimate customers. Thus, in some embodiments, network data analyzer 120 may output the list of IP addresses in the third group for additional manual analysis.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A method for detecting an anomaly on a computer network comprising:
   generating a time series of network traffic values, wherein each value of the time series of network traffic values comprises a total number of domain name system (DNS) requests made to a DNS server to resolve each DNS request divided by a predetermined time interval;
   generating a first variance by dividing a sum of the network traffic values of time entries corresponding to a first time-window by the network traffic value of the time series for the time entry;
   generating a second variance by dividing a sum of the network traffic values of time entries corresponding to a second time-window by the network traffic value of the time series for the time entry;

calculating a deviation score for at least one time entry in the time series by dividing the second variance by the first variance;

detecting an anomaly at the at least one time entry based on the deviation score;

identifying a first group of IP addresses corresponding to the first time-window that corresponds to the at least one time entry where the anomaly occurred;

identifying a second group of IP addresses corresponding to the second time-window that corresponds to the at least one time entry where the anomaly occurred; and identifying a third group of IP addresses by comparing the first group of IP addresses to the second group of IP addresses for determining whether one or more of the IP addresses in the third group is responsible for the anomaly.

2. The method according to claim 1, wherein the deviation score is about 0.5 to 1.5.

3. The method according to claim 1, wherein the first time-window is larger than the second time-window.

4. The method according to claim 3, wherein identifying the third group of IP addresses includes:

identifying, as the third group of IP addresses, the IP addresses that were included in the second group of IP addresses but were not included in a part of the first group of IP addresses corresponding to a part in the first time-window that does not overlap the second time-window, if the deviation score is greater than 1.5.

5. The method according to claim 4, further comprising:

instructing one or more servers on the computer network not to process request from the one or more IP addresses included in the third group of IP addresses.

6. The method according to claim 3, wherein identifying the third group of IP addresses includes:

identifying, as the third group of IP addresses, the IP addresses that were included in the first group of IP addresses but not included in the second group of IP addresses, if the deviation score is less than 0.5.

7. The method according to claim 1, wherein the identifying the third group of IP addresses further comprising identifying the third group of IP addresses that have stopped making network requests indicated by a deviation score less than 0.5, wherein the deviation score less than 0.5 indicates that there has been a decrease in an amount of network traffic in the small time-window.

8. The method according to claim 1, wherein the identifying the third group of IP addresses further comprising identifying the third group of IP addresses that have started making network requests indicated by a deviation score greater than 1.5, wherein the deviation score greater than 1.5 indicates that there has been an increase in an amount of network traffic in the small time-window.

9. A network data analysis system for detecting an anomaly on a computer network comprising:

a processor; and a memory coupled to the processor, the memory storing instructions to direct the processor to perform operations comprising:

generating a time series of network traffic values, wherein each value of the time series of network traffic values comprises a total number of domain name system (DNS) requests made to a DNS server to resolve each DNS request divided by a predetermined time interval;

generating a first variance by dividing a sum of the network traffic values of time entries corresponding to a first time-window by the network traffic value of the time series for the time entry;

generating a second variance by dividing a sum of the network traffic values of time entries corresponding to a second time-window by the network traffic value of the time series for the time entry;

calculating a deviation score for at least one time entry in the time series by dividing the second variance by the first variance;

detecting an anomaly at the at least one time entry based on the deviation score;

identifying a first group of IP addresses corresponding to the first time-window that corresponds to the at least one time entry where the anomaly occurred;

identifying a second group of IP addresses corresponding to the second time-window that corresponds to the at least one time entry where the anomaly occurred; and identifying a third group of IP addresses by comparing the first group of IP addresses to the second group of IP addresses for determining whether one or more of the IP addresses in the third group is responsible for the anomaly.

10. The network data analysis system according to claim 9, wherein identifying the third group of IP addresses includes:

identifying, as the third group of IP addresses, the IP addresses that were included in the second group of IP addresses but were not included in a part of the first group of IP addresses corresponding to a part in the first time-window that does not overlap the second time-window, if the deviation score is greater than 1.5.

11. The network data analysis system according to claim 10, the operations performed by the processor further comprising:

instructing one or more servers on the computer network not to process requests from the one or more IP addresses included in the third group of IP addresses.

12. The network data analysis system according to claim 9, wherein the identifying the third group of IP addresses further comprising identifying the third group of IP addresses that have stopped making network requests indicated by a deviation score less than 0.5, wherein the deviation score less than 0.5 indicates that there has been a decrease in an amount of network traffic in the small time-window.

13. The network data analysis system according to claim 9, wherein the identifying the third group of IP addresses further comprising identifying the third group of IP addresses that have started making network requests indicated by a deviation score greater than 1.5, wherein the deviation score greater than 1.5 indicates that there has been an increase in an amount of network traffic in the small time-window.

14. A computer-readable storage device storing instructions for analyzing network data, the instructions causing one or more computer processors to perform operations, comprising:

generating a time series of network traffic values, wherein each value of the time series of network traffic values comprises a total number of domain name system (DNS) requests made to a DNS server to resolve each DNS request divided by a predetermined time interval;

generating a first variance by dividing a sum of the network traffic values of time entries corresponding to a first time-window by the network traffic value of the time series for the time entry;

generating a second variance by dividing a sum of the network traffic values of time entries corresponding to a second time-window by the network traffic value of the time series for the time entry;

calculating a deviation score for at least one time entry in the time series by dividing the second variance by the first variance;

detecting an anomaly at the at least one time entry based on the deviation score;

identifying a first group of IP addresses corresponding to the first time-window that corresponds to the at least one time entry where the anomaly occurred;

identifying a second group of IP addresses corresponding to the second time-window that corresponds to the at least one time entry where the anomaly occurred; and identifying a third group of IP addresses by comparing the first group of IP addresses to the second group of IP addresses for determining whether one or more of the IP addresses in the third group is responsible for the anomaly.

15. The computer-readable storage device according to claim 14, wherein identifying the third group of IP addresses includes:

identifying, as the third group of IP addresses, the IP addresses that were included in the second group of IP addresses but were not included in a part of the first group of IP addresses corresponding to a part in the first time-window that does not overlap the second time-window, if the deviation score is greater than 1.5.

16. The computer-readable storage device according to claim 15, the instructions further causing the one or more computer processors to:

instruct one or more servers on the computer network not to process requests from the one or more IP addresses included in the third group of IP addresses.

17. The computer-readable storage device according to claim 14, wherein identifying the third group of IP addresses includes:

identifying, as the third group of IP addresses, the IP addresses that were included in the first group of IP addresses but not included in the second group of IP addresses, if the deviation score is less than 0.5.

18. The computer-readable storage device according to claim 14, wherein the identifying the third group of IP addresses further comprising identifying the third group of IP addresses that have stopped making network requests indicated by a deviation score less than 0.5, wherein the deviation score less than 0.5 indicates that there has been a decrease in an amount of network traffic in the small time-window.

19. The computer-readable storage device according to claim 14, wherein the identifying the third group of IP addresses further comprising identifying the third group of IP addresses that have started making network requests indicated by a deviation score greater than 1.5, wherein the deviation score greater than 1.5 indicates that there has been an increase in an amount of network traffic in the small time-window.

* * * * *